(12) United States Patent
Lee et al.

(10) Patent No.: US 9,436,039 B2
(45) Date of Patent: Sep. 6, 2016

(54) LIQUID CRYSTAL DISPLAY AND METHOD FOR MANUFACTURING THE SAME

(71) Applicant: SAMSUNG DISPLAY CO., LTD., Yongin, Gyeonggi-Do (KR)

(72) Inventors: Taek Joon Lee, Gyeonggi-Do (KR); Hyun Ku Ahn, Gyeonggi-Do (KR); Jae Jin Lyu, Gyeonggi-Do (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/315,974

(22) Filed: Jun. 26, 2014

(65) Prior Publication Data
US 2015/0062517 A1 Mar. 5, 2015

(30) Foreign Application Priority Data
Sep. 2, 2013 (KR) .................... 10-2013-0104910

(51) Int. Cl.
C09K 19/00 (2006.01)
G02F 1/1337 (2006.01)
G02F 1/1343 (2006.01)

(52) U.S. Cl.
CPC ....... G02F 1/133711 (2013.01); G02F 1/1337 (2013.01); G02F 1/133707 (2013.01); G02F 2001/133726 (2013.01); G02F 2001/134345 (2013.01); Y10T 428/10 (2015.01); Y10T 428/1005 (2015.01); Y10T 428/1009 (2015.01); Y10T 428/1014 (2015.01)

(58) Field of Classification Search
CPC .................. G02F 1/133711; G02F 1/133719; G02F 1/133723; G02F 1/133753; G02F 2001/133726; C08G 77/20; C08G 77/44; Y10T 428/10; Y10T 428/1005; Y10T 428/1009; Y10T 428/1014
USPC ....... 428/1.1, 1.2, 1.21, 1.23, 1.26; 349/123, 349/124, 131; 438/30
See application file for complete search history.

(56) References Cited

U.S. PATENT DOCUMENTS

| | | | |
|---|---|---|---|
| 6,091,471 | A | 7/2000 | Kim et al. |
| 6,696,114 | B1 | 2/2004 | Kawatsuki et al. |
| 8,178,172 | B2 | 5/2012 | Kim et al. |
| 8,216,649 | B2 | 7/2012 | Akiike et al. |
| 2008/0160222 | A1 | 7/2008 | Harding et al. |
| 2010/0201931 | A1 | 8/2010 | Jang et al. |
| 2012/0249940 | A1 | 10/2012 | Choi et al. |
| 2013/0129965 | A1 | 5/2013 | Jeong et al. |

FOREIGN PATENT DOCUMENTS

| | | |
|---|---|---|
| CN | 103064217 A | 4/2013 |
| EP | 2 584 400 A1 | 4/2013 |
| JP | 05-196945 | 8/1993 |
| JP | 4140252 | 6/2008 |
| JP | 2008-176142 | 7/2008 |

(Continued)

*Primary Examiner* — Ruiyun Zhang
(74) *Attorney, Agent, or Firm* — Lee & Morse, P.C.

(57) ABSTRACT

A liquid crystal display may include: a first substrate, a second substrate facing the first substrate, a field generating electrode disposed on at least one of the first substrate and the second substrate, an alignment layer disposed on the field generating electrode, and a liquid crystal layer disposed between the first substrate and the second substrate. The alignment layer may include a lower layer including an organic material and an upper layer disposed on the lower layer and including an inorganic material.

20 Claims, 12 Drawing Sheets

(56) References Cited

FOREIGN PATENT DOCUMENTS

| JP | 2013-088803 | 5/2013 |
|---|---|---|
| JP | 2013-109353 | 6/2013 |
| KR | 10-0711901 | 4/2007 |
| KR | 10-2008-0097839 A | 11/2008 |
| KR | 10-2009-0055614 A | 6/2009 |
| KR | 10-0927703 | 11/2009 |
| KR | 10-2011-0104416 A | 9/2011 |
| KR | 10-2013-0048297 A | 5/2013 |
| KR | 10-2013-0057153 A | 5/2013 |

LIQUID CRYSTAL DISPLAY AND METHOD FOR MANUFACTURING THE SAME

CROSS-REFERENCE TO RELATED APPLICATION

The present application claims priority under 35 U.S.C. §119 to Korean Patent Application No. 10-2013-0104910, filed on Sep. 2, 2013, in the Korean Intellectual Property Office, and entitled: "Liquid Crystal Display and Method For Manufacturing The Same," which is incorporated by reference herein in its entirety.

BACKGROUND

1. Field

Embodiments relate to a liquid crystal display and a method for manufacturing the same.

2. Description of the Related Art

A liquid crystal display is one of the most common types of flat panel displays currently in use, and includes two display panels formed of field generating electrodes such as a pixel electrode and a common electrode, and a liquid crystal layer interposed therebetween.

The liquid crystal display displays an image by applying a voltage to the field generating electrode to generate an electric field on the liquid crystal layer, and thus to determine alignment of liquid crystal molecules included in the liquid crystal layer therethrough, and control polarization of incident light.

In order to determine alignment of the liquid crystal molecules, a reactive mesogen may be included in an alignment layer to determine initial alignment of the liquid crystal molecules.

The above information disclosed in this Background section is only for enhancement of understanding of the background and therefore it may contain information that does not form the prior art that is already known in this country to a person of ordinary skill in the art.

SUMMARY

Embodiments provide a liquid crystal display including: a first substrate, a second substrate facing the first substrate, a field generating electrode disposed on at least one of the first substrate and the second substrate, an alignment layer disposed on the field generating electrode, and a liquid crystal layer disposed between the first substrate and the second substrate, in which the alignment layer includes a lower layer including an organic material and an upper layer disposed on the lower layer and including an inorganic material.

The upper layer and the lower layer may be layer-separated, and the upper layer may include a plurality of inorganic alignment layers disposed in an island shape on the lower layer.

The inorganic alignment layer may include a main chain and a side chain connected to the main chain, the main chain may include polysiloxane, and the side chain may include a photo-reactive group.

The side chain of the inorganic alignment layer may include at least one of a compound represented by the following Chemical Formula 1 and a compound represented by the following Chemical Formula 2.

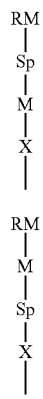

Chemical Formula 1

Chemical Formula 2

Herein, in Chemical Formula 1 and Chemical Formula 2, RM is

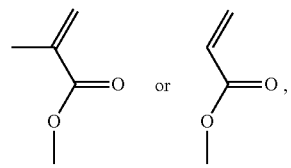

Sp is a carbon chain structure represented by —(CH$_2$)$_n$—, in which n is 2 to 10, M is any one of benzene, cyclohexane,

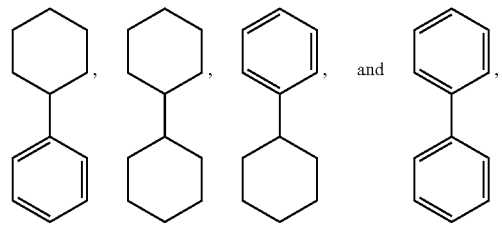

and X is

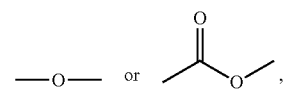

The lower layer may include the main chain and the side chain connected to the main chain, the main chain may include polyimide, and the side chain may include a vertical alignment group.

The side chain of the lower layer may include at least one of a compound represented by the following Chemical Formula 3 and a compound represented by the following Chemical Formula 4.

Chemical Formula 3

Chemical Formula 4

Herein, in Chemical Formula 3 and Chemical Formula 4, A is an alkyl group having 3 to 30 carbon atoms, M is any one of benzene, cyclohexane,

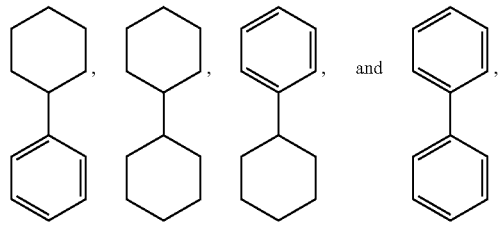

and X is

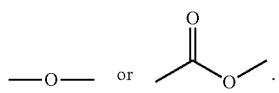

The liquid crystal display may further include a column spacer disposed between the first substrate and the second substrate, in which the alignment layer may cover the column spacer in a uniform thickness.

The alignment layer may include a portion disposed between the column spacer and any one of the first substrate and the second substrate.

The liquid crystal layer may include a liquid crystal material and an alignment polymer.

Another exemplary embodiment provides a method for manufacturing a liquid crystal display, including: forming a field generating electrode on at least one of a first substrate and a second substrate facing the first substrate, forming an alignment layer on the field generating electrode, forming a liquid crystal layer between the first substrate and the second substrate, and irradiating light on the alignment layer, in which the alignment layer is formed to include a lower layer including an organic material and an upper layer disposed on the lower layer and including an inorganic material.

The forming of the alignment layer may include adding the inorganic material of a monomolecule to a solution including the organic material of a polymer to form an organic and inorganic mixture material, applying the organic and inorganic mixture material on the field generating electrode, heat-treating the organic and inorganic mixture material, and layer-separating the organic material and the inorganic material to form the upper layer and the lower layer.

The upper layer may be formed of a plurality of inorganic alignment layers disposed in an island shape on the lower layer.

The inorganic material of the monomolecule may include siloxane and a photo-reactive group.

The inorganic material of the monomolecule may include at least one of a compound represented by the following Chemical Formula 5 and a compound represented by the following Chemical Formula 6.

Chemical Formula 5

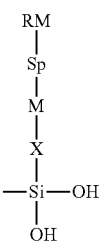

Chemical Formula 6

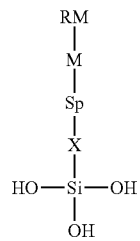

Herein, in Chemical Formula 5 and Chemical Formula 6, RM is

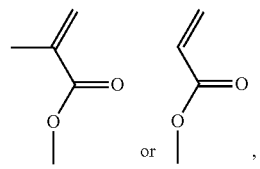

Sp is a carbon chain structure represented by $-(CH_2)_n-$, in which n is 2 to 10, M is any one of benzene, cyclohexane,

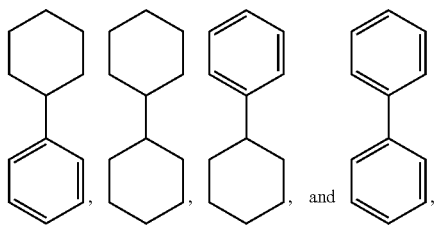

and X is

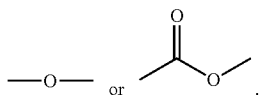

The organic material of the polymer may include polyimide to which a vertical alignment group is connected as a side chain.

The vertical alignment group may include at least one of a compound represented by the following Chemical Formula 3 and a compound represented by the following Chemical Formula 4.

Chemical Formula 3

A
|
M
|
X

Chemical Formula 4

A
|
X
|

Herein, in Chemical Formula 3 and Chemical Formula 4, A is an alkyl group having 3 to 30 carbon atoms, M is any one of benzene, cyclohexane,

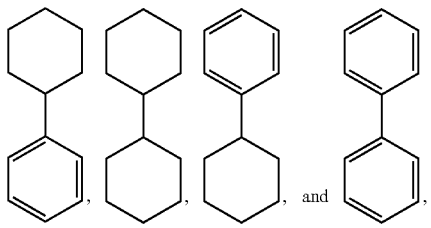

and X is

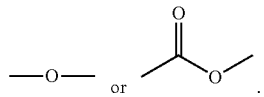

The method may further include forming an electric field on the liquid crystal layer before the irradiating of light on the alignment layer.

The method may further include forming a column spacer on the first substrate or the second substrate before the forming of the alignment layer, in which the alignment layer is formed to cover the column spacer in a uniform thickness.

The forming of the liquid crystal layer may include injecting a liquid crystal material and an alignment aid agent between the first substrate and the second substrate, and irradiating light on the liquid crystal layer to form an alignment polymer.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
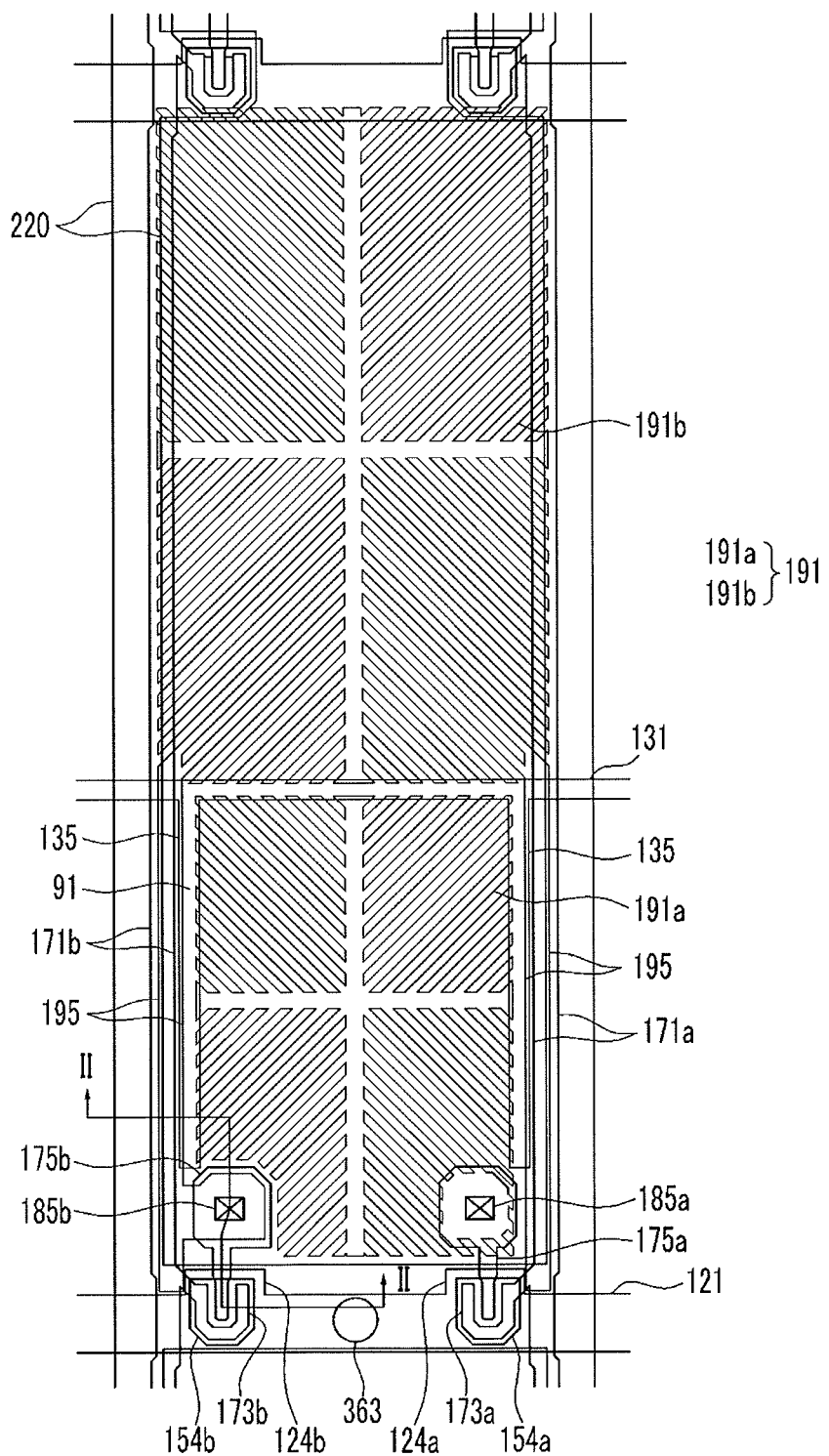
FIG. 1 illustrates a top plan view illustrating a liquid crystal display according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening them may also be present. Like reference numerals designate like elements throughout the specification.

Figure 2:
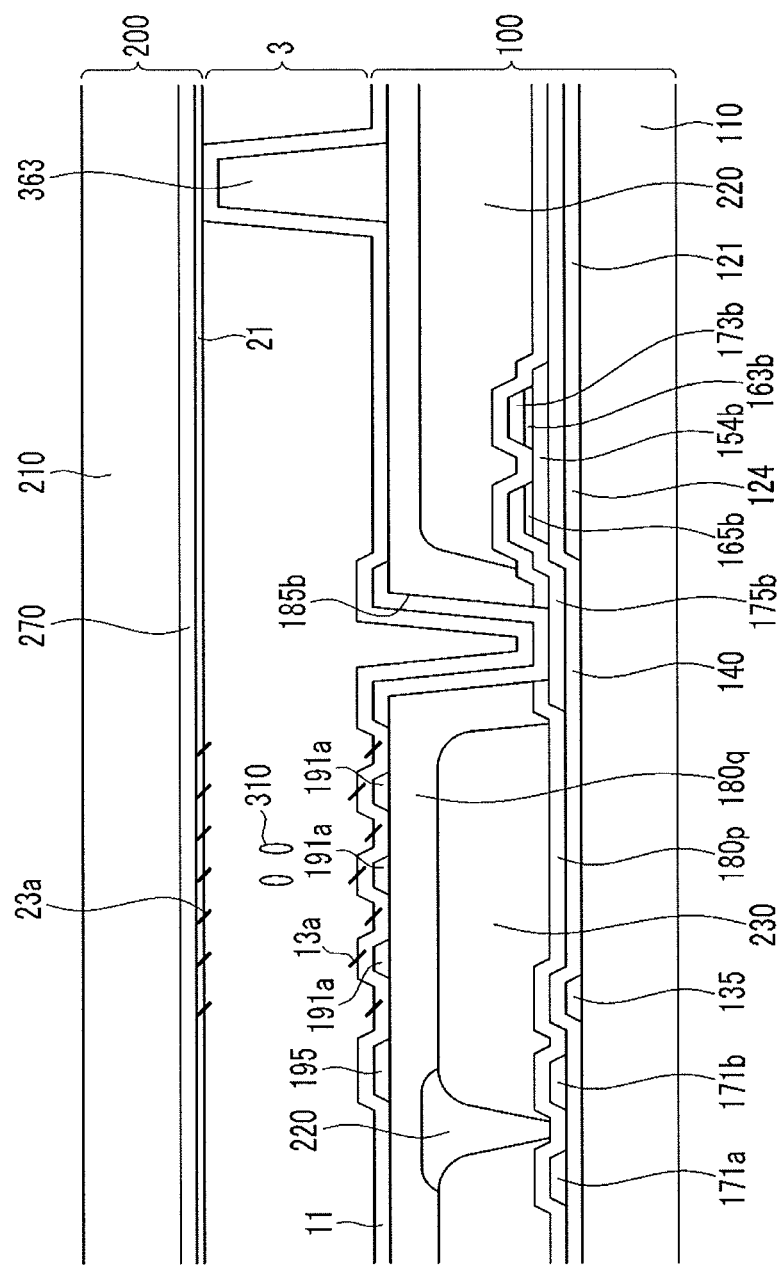
FIG. 2 illustrates a cross-sectional view taken along cut line II-II of FIG. 1.

FIG. 1 illustrates a top plan view illustrating a liquid crystal display according to an exemplary embodiment. FIG. 2 illustrates a cross-sectional view taken along cut line II-II of FIG. 1.

Referring to FIGS. 1 and 2, the liquid crystal display according to an exemplary embodiment includes a lower display panel 100 and an upper display panel 200 facing each other, and a liquid crystal layer 3 interposed between the two display panels 100 and 200.

First, the lower display panel 100 will be described.

A plurality of gate lines 121 and a plurality of storage electrode lines 131 and 135 may be disposed on an insulating substrate 110 corresponding to a first substrate.

The gate line 121 transfers a gate signal and may mainly extend in a horizontal direction. Each gate line 121 may include a plurality of first and second gate electrodes 124a and 124b protruding upwardly.

The storage electrode lines 131 and 135 may include a stem line 131 extending in substantially parallel to the gate lines 121 and a plurality of storage electrodes 135 extending therefrom.

The shape and disposal of the storage electrode lines 131 and 135 may take various forms.

A gate insulating layer 140 may be formed on the gate lines 121 and the storage electrode lines 131 and 135, and a plurality of semiconductor layers 154a and 154b made of amorphous or crystalline silicon and the like may be disposed on the gate insulating layer 140.

A plurality of pairs of ohmic contacts 163b and 165b may be formed on each of the semiconductor layers 154a and 154b, and the ohmic contacts 163b and 165b may be made of silicide or a material such as n+ hydrogenated amorphous silicon in which n-type impurity is doped in a high concentration.

A plurality of pairs of data lines 171a and 171b and a plurality of pairs of first and second drain electrodes 175a and 175b may be disposed on the ohmic contacts 163b and 165b and the gate insulating layer 140.

The data lines 171a and 171b may transfer a data signal and may mainly extend in a vertical direction to cross the gate line 121 and the stem line 131 of the storage electrode line. The data lines 171a and 171b may extend toward the first and second gate electrodes 124a and 124b and include first and second source electrodes 173a and 173b bent in a U-shape. The first and second source electrodes 173a and 173b may face the first and second drain electrodes 175a and 175b based on the first and second gate electrodes 124a and 124b.

Each of the first and second drain electrodes 175a and 175b may extend upwardly from an end thereof, which is partially surrounded by the first and second source electrodes 173a and 173b, and the other end thereof may have a wide area for connection to another layer.

However, the shape and disposal of the first and second drain electrodes 175a and 175b and the data lines 171a and 171b may be changed into various forms.

The first and second gate electrodes 124a and 124b, the first and second source electrodes 173a and 173b, and the first and second drain electrodes 175a and 175b may form first and second thin film transistors (TFT) together with the first and second semiconductor layers 154a and 154b. Channels of the first and second thin film transistors may be formed in the first and second semiconductor layers 154a and 154b between the first and second source electrodes 173a and 173b and the first and second drain electrodes 175a and 175b.

The ohmic contacts 163b and 165b may exist only between the semiconductor layers 154a and 154b disposed therebeneath and the data lines 171a and 171b and the drain electrodes 175a and 175b disposed thereon, and reduce contact resistance therebetween. In the semiconductors 154a and 154b, an exposed portion that is not covered with the data lines 171a and 171b and the drain electrodes 175a and 175b may exist between the source electrodes 173a and 173b and the drain electrodes 175a and 175b.

A lower passivation layer 180p made of silicon nitride or silicon oxide may be disposed on the data lines 171a and 171b, the drain electrodes 175a and 175b, and the exposed portions of the semiconductor layers 154a and 154b.

A color filter 230 may be disposed on the lower passivation layer 180p. The color filter 230 may include a color filter having three colors of red, green, and blue. A single layer or a double layer of chromium and chromium oxide, or a light blocking member 220 formed of an organic material may be formed on the color filter 230. The light blocking member 220 may have openings arranged in a matrix form.

An upper passivation layer 180q formed of a transparent organic insulating material may be formed on the color filter 230 and the light blocking member 220. The upper passivation layer 180q prevents the color filter 230 from being exposed and provides a flat surface. A plurality of contact holes 185a and 185b through which the first and second drain electrodes 175a and 175b may be exposed may be formed in the upper passivation layer 180q.

A plurality of pixel electrodes 191 may be formed on the upper passivation layer 180q. The pixel electrode 191 may be made of a transparent conductive material such as ITO or IZO, or reflective metal such as aluminum, silver, chromium, or an alloy thereof.

Figure 5:
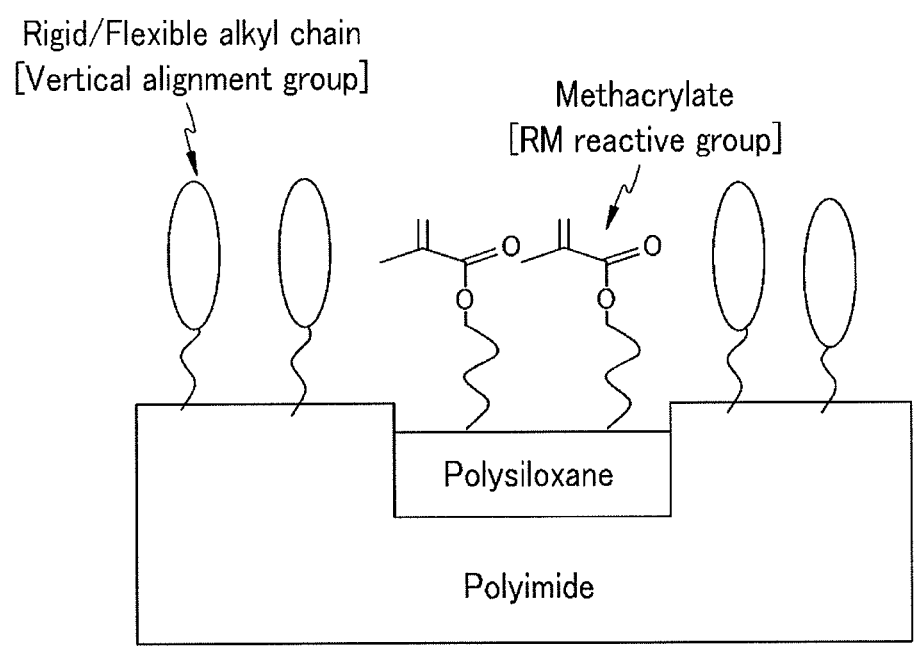
FIG. 5 illustrates a view schematically illustrating the alignment layer according to an exemplary embodiment.

Each pixel electrode 191 may include first and second sub-pixel electrodes 191a and 191b separated from each other, and the first and second sub-pixel electrodes 191a and 191b may each include one or more basic electrodes 199 as illustrated in FIG. 5 or modifications thereof.

A structure of the pixel electrode 191 will be described later with reference to FIGS. 8 and 9.

Next, the upper display panel 200 will be described.

A common electrode 270 may be formed on an entire surface of a transparent insulating substrate 210 corresponding to a second substrate in the upper display panel 200.

A column spacer 363 may be formed in order to maintain a space between the upper display panel 200 and the lower display panel 100.

Alignment layers 11 and 21 may be applied on internal surfaces of the lower display panel 100 and the upper display panel 200, respectively and may be vertical alignment layers. In the present exemplary embodiment, the lower alignment layer 11 may cover the column spacer 363 in a substantially uniform thickness.

In the present exemplary embodiment, the alignment layers 11 and 21 include alignment polymers 13a and 23a. The alignment polymers 13a and 23a may be formed by irradiating light on a reactive mesogen including a photo-reactive group.

Hereinafter, the alignment layer according to the present exemplary embodiment will be described in detail with reference to FIGS. 3 to 5.

Figure 3:
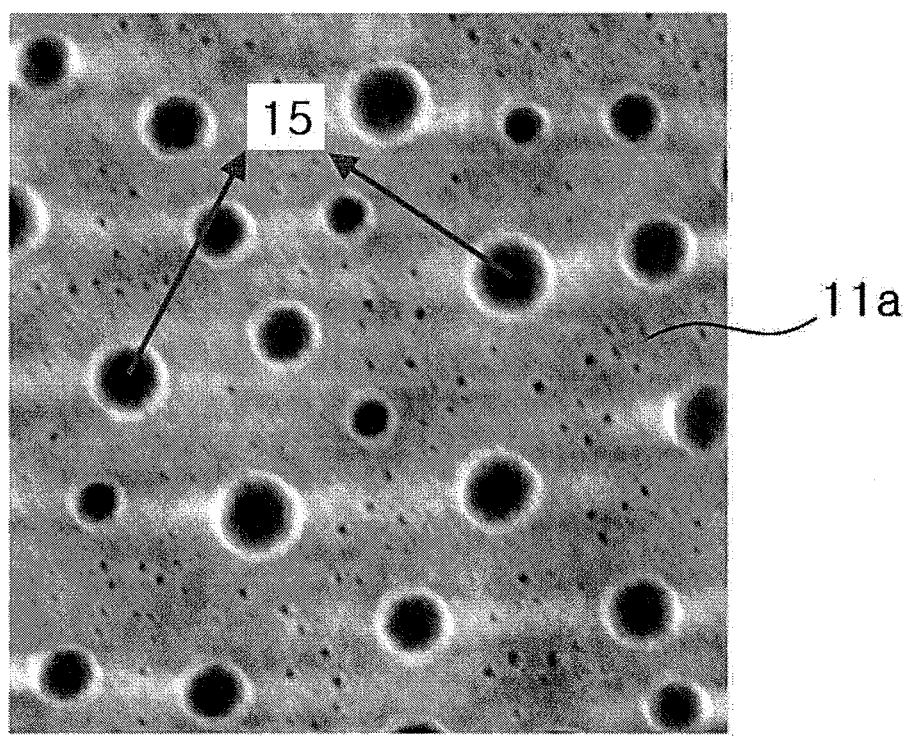
FIG. 3 illustrates a surface image of an atomic force microscopy (AFM) illustrating an alignment layer according to an exemplary embodiment.

FIG. 3 illustrates a surface image of an atomic force microscopy (AFM) illustrating the alignment layer according to an exemplary embodiment. FIG. 4 illustrates a view illustrating a cross section of the surface image of FIG. 3. FIG. 5 illustrates a view schematically illustrating the alignment layer according to an exemplary embodiment.

Figure 4:
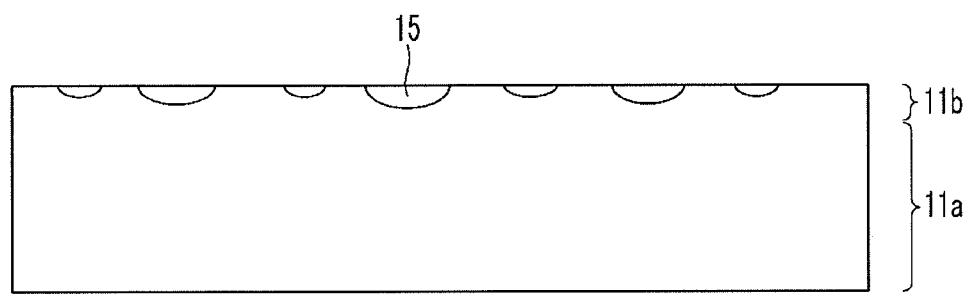
FIG. 4 illustrates a view illustrating a cross section of the surface image of FIG. 3.

Referring to FIGS. 3 and 4, the alignment layers 11 and 21 according to the present exemplary embodiment include a lower layer 11a including an organic material and an upper layer 11b disposed on the lower layer 11a and including an inorganic material. In the present exemplary embodiment, the upper layer 11b may include a plurality of inorganic alignment layers 15 disposed in an island shape on the lower layer 11a. The plurality of inorganic alignment layers 15 include a main chain such as polysiloxane and a side chain connected to the main chain. Herein, the side chain includes the photo-reactive group. Specifically, the side chain of the inorganic alignment layer 15 may include at least one of a compound represented by the following Chemical Formula 1 and a compound represented by the following Chemical Formula 2.

Chemical Formula 1

Chemical Formula 2

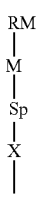

Herein, in Chemical Formula 1 and Chemical Formula 2, RM is

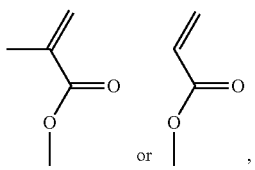

Sp is a carbon chain structure represented by —(CH$_2$)$_n$—, in which n is 2 to 10, M is any one of benzene, cyclohexane,

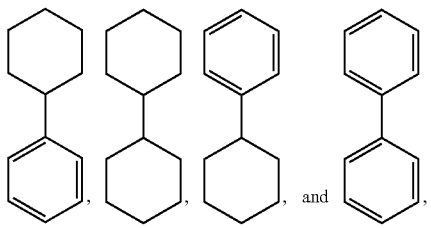

and X is

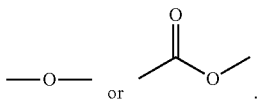

In the present exemplary embodiment, the lower layer 11a may include the main chain such as polyimide and the side chain connected to the main chain. Herein, the side chain may include a vertical alignment group. Specifically, the side chain of the lower layer 11a may include at least one of a compound represented by the following Chemical Formula 3 and a compound represented by the following Chemical Formula 4.

Chemical Formula 3

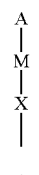

Chemical Formula 4

Herein, in Chemical Formula 3 and Chemical Formula 4, A is an alkyl group having 3 to 30 carbon atoms, M is any one of benzene, cyclohexane,

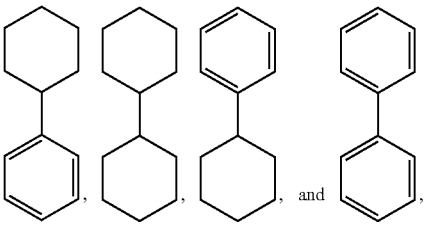

and X is

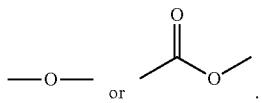

In the present exemplary embodiment, since the lower layer 11a and the upper layer 11b of the alignment layers 11 and 21 may be formed of the organic material and the inorganic material having different properties, the lower layer 11a and the upper layer 11b may be naturally separated in a manufacturing process. Referring to FIG. 5, the polyimide main chain forming the lower layer 11a may cover the layer on which the alignment layers 11 and 21 may be applied, and the polysiloxane main chain and side chain forming the upper layer 11b may be disposed above the lower layer 11a while floating. The vertical alignment group included in the side chain of the lower layer 11a may be disposed between the inorganic alignment layers 15. Thus, because the layer on which the alignment layers 11 and 21 may be applied may be covered with the organic material having a good coating property, coating inferiority may be prevented and coating improved. Polysiloxane forming an inorganic alignment layer may be dissolved in hexylene glycol, and the thus-formed solution may have reduced surface energy resulting in a poor coating. In the present exemplary embodiment, a coated lower surface may be covered with the organic material such as polyimide instead of the inorganic alignment material.

The Examples and Comparative Examples herein are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples FIG. 6 illustrates a coating profile in a step portion according to a Comparative Example, and FIG. 7 illustrates a coating profile in a step portion when the alignment layer according to an exemplary embodiment may be used.

Figure 6:
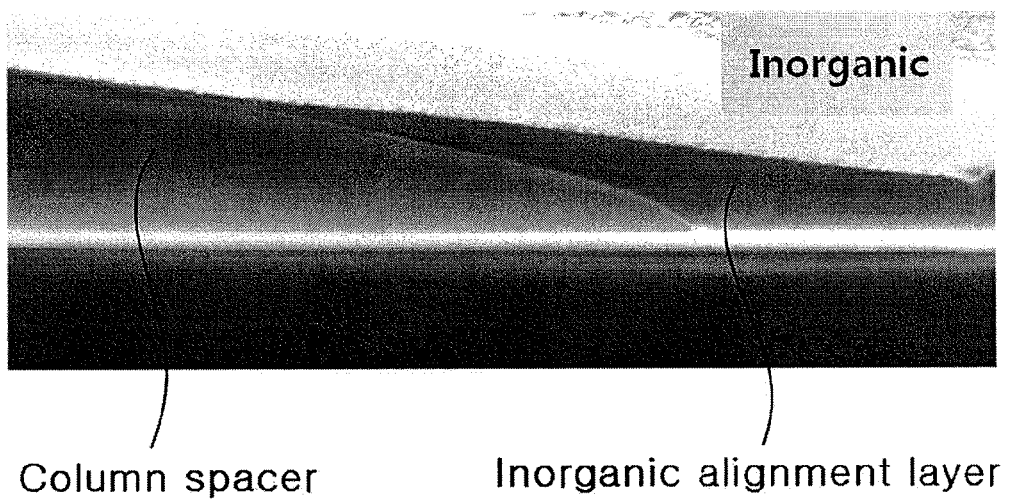
FIG. 6 illustrates a coating profile in a step portion according to a Comparative Example.

Referring to FIG. 6, when the alignment layer is formed of only the inorganic material, and the alignment material is applied on the column spacer, the alignment material may not be uniformly applied but may be accumulated in a relatively large amount in a portion at which the step starts.

The column spacer may act to maintain an interval of upper and lower plates and act as a spring when external impact may be applied. However, when the alignment layer uses the inorganic material, the alignment layer may not be uniformly formed on the column spacer because the coating in not of good quality. Accordingly, the elastic force of the column spacer may become poor, and a shape of the column spacer may not be restored to an original shape after an external impact is applied. Therefore, the column spacer may not be restored to an original position to form voids, and gas may move upwardly from other layers to generate a black portion (the liquid crystal is not filled but gas may be filled) in a picture.

Figure 7:
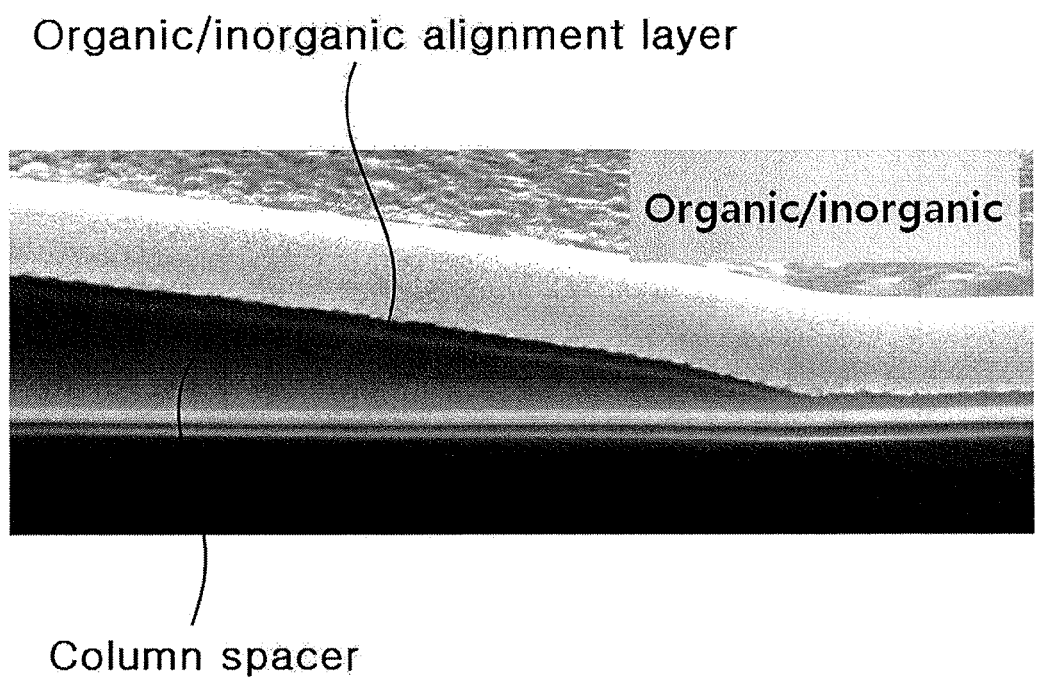
FIG. 7 illustrates a coating profile in a step portion when the alignment layer according to an exemplary embodiment is used.

Referring to FIG. 7, in the case where the alignment layer includes the lower layer including the organic material and the upper layer including the inorganic material, the lower layer of the organic material may be applied on the step portion of the column spacer in a substantially uniform thickness.

Additionally, a polarizer (not illustrated) may be provided on external surfaces of the lower display panel 100 and the upper display panel 200.

Referring back to FIGS. 1 and 2, the liquid crystal layer 3 including liquid crystal molecules 310 may be interposed between the lower display panel 100 and the upper display panel 200.

The liquid crystal molecules 310 may have negative dielectric anisotropy, and may be aligned so that a long axis thereof may be almost vertical to surfaces of the two display panels 100 and 200 in a state where there may be no electric field.

The alignment polymers 13a and 23a formed by irradiating light on the reactive mesogen include the photoreactive group, and the alignment polymers 13a and 23a act to control a pretilt that is an initial alignment direction of the liquid crystal molecules 310.

Figure 8:
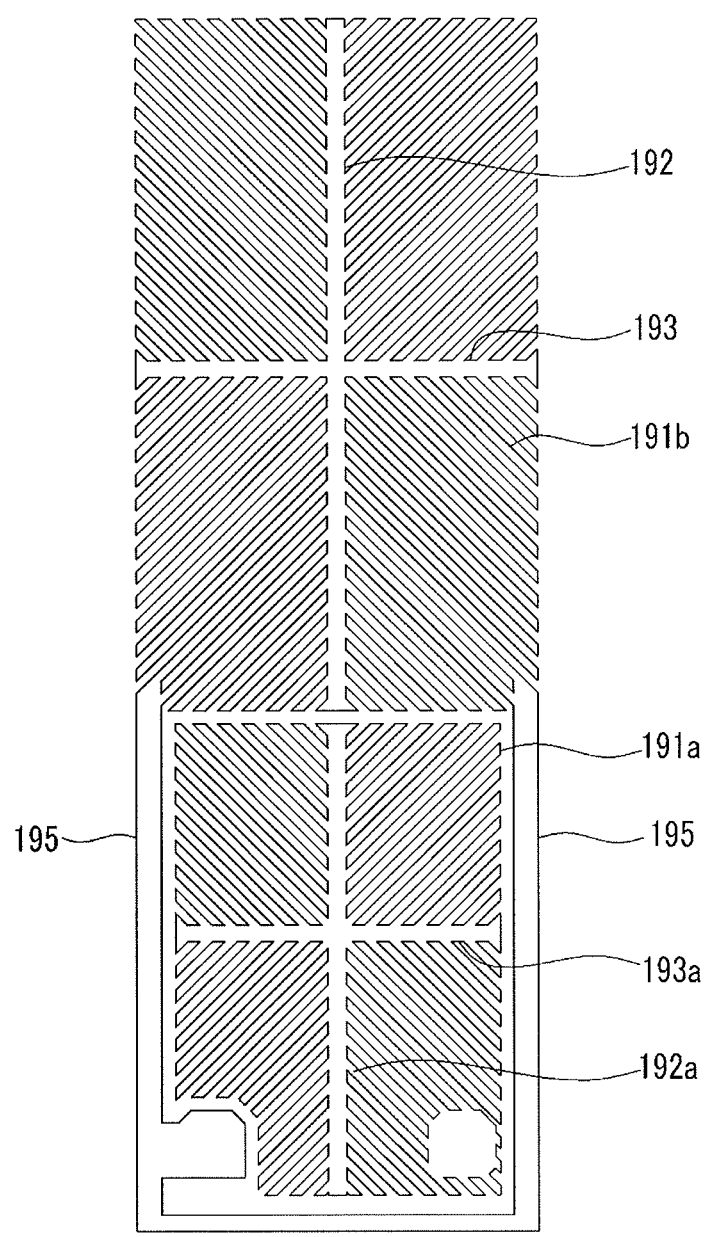
FIG. 8 illustrates a top plan view illustrating a pixel electrode according to an exemplary embodiment.

FIG. 8 illustrates a top plan view illustrating a pixel electrode according to an exemplary embodiment. FIG. 9 illustrates a top plan view illustrating a basic electrode of the liquid crystal display according to an exemplary embodiment.

The basic electrode 199 will be described in detail with reference to FIGS. 8 and 9.

Figure 9:
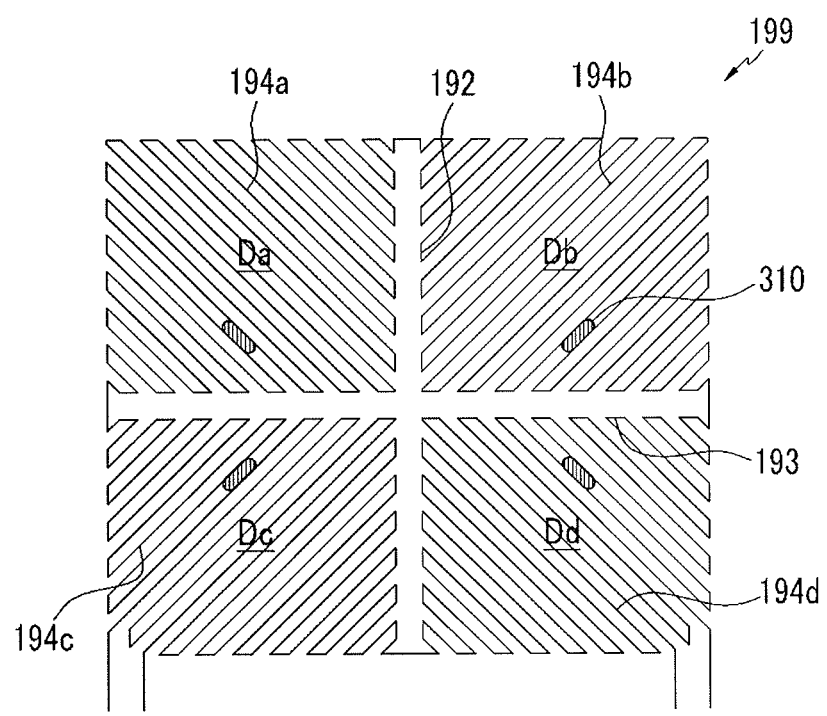
FIG. 9 illustrates a top plan view illustrating a basic electrode of the liquid crystal display according to an exemplary embodiment.

As illustrated in FIG. 9, the entire shape of the basic electrode 199 may be a quadrangle, and the basic electrode 199 may include a cross-shaped stem portion formed of a horizontal stem portion 193 and a vertical stem portion 192 that may be vertical thereto. Further, the basic electrode 199 may be divided into a first sub-region Da, a second sub-region Db, a third sub-region Dc, and a fourth sub-region Dd by the horizontal stem portion 193 and the vertical stem portion 192. Each of the sub-regions Da, Db, Dc, and Dd may include a plurality of first to fourth fine branch portions 194a, 194b, 194c, and 194d.

The first fine branch portion 194a may extend obliquely in an upper left direction from the horizontal stem portion 193 or the vertical stem portion 192, and the second fine branch portion 194b may extend obliquely in an upper right direction from the horizontal stem portion 193 or the vertical stem portion 192. Further, the third fine branch portion 194c may extend in a lower left direction from the horizontal stem portion 193 or the vertical stem portion 192, and the fourth fine branch portion 194d may extend obliquely in a lower right direction from the horizontal stem portion 193 or the vertical stem portion 192.

The first to fourth fine branch portions 194a, 194b, 194c, and 194d may form an angle of about 45° or 135° to the gate line 121 or the horizontal stem portion 193. Further, the fine branch portions 194a, 194b, 194c, and 194d of the two adjacent sub-regions Da, Db, Dc, and Dd may be orthogonal to each other.

A width of the fine branch portions 194a-194d may be about 2.0 µm to about 5.0 µm, and an interval between the adjacent fine branch portions 194a-194d in one sub-region Da-Dd may be about 2.5 µm to about 5.0 µm.

Although not illustrated in the drawings, the width of the fine branch portions 194a, 194b, 194c, and 194d may be increased as the fine branch portions become close to the horizontal stem portion 193 or the vertical stem portion 192.

Referring to FIGS. 1, 2, and 8, each of the first and second sub-pixel electrodes 191a and 191b may include one basic electrode 199. However, an area occupied by the second sub-pixel electrode 191b in the entire pixel electrode 191 may be larger than the area occupied by the first sub-pixel electrode 191a, and in this case, the basic electrodes 199 having different sizes may be formed so that the area of the second sub-pixel electrode 191b may be larger than the area of the first sub-pixel electrode 191a by about 1.0 time to 2.2 times.

The second sub-pixel electrode 191b includes a pair of branches 195 extending along the data line 171. The branches 195 may be disposed between the first sub-pixel electrode 191a and the data lines 171a and 171b, and connected at a lower end of the first sub-pixel electrode 191a. The first and second sub-pixel electrodes 191a and 191b may be physically and electrically connected to the first and second drain electrodes 175a and 175b through contact holes 185a and 185b, and receive a data voltage from the first and second drain electrodes 175a and 175b.

If the voltage is applied to the pixel electrode 191 and the common electrode 270, the liquid crystal 310 responds to the electric field formed between the pixel electrode 191 and the common electrode 270, such that a direction of the long axis thereof may be changed into a direction that may be vertical to a direction of the electric field. The degree of change in polarization of incident light to the liquid crystal layer 3 may vary according to a degree of inclination of the liquid crystal 310, the change in polarization may be represented by a change in transmittance by the polarizer, and the liquid crystal display may display an image therethrough.

The direction where the liquid crystal 310 is inclined may be determined by the fine branch portions 194a, 194b, 194c, and 194d of the pixel electrode 191, and the liquid crystal 310 may be inclined in a direction that is parallel to a length direction of the fine branch portions 194a, 194b, 194c, and 194d. Since one pixel electrode 191 may include four sub-regions Da, Db, Dc, and Dd where length directions of the fine branch portions 194a, 194b, 194c, and 194d may be different from each other, the directions where the liquid crystal 310 may be inclined may be approximately four directions. Four domains where alignment directions of the liquid crystal 310 are different from each other may be formed in the liquid crystal layer 3. As described above, a viewing angle of the liquid crystal display may be improved by diversifying the inclination direction of liquid crystal.

Figure 10:
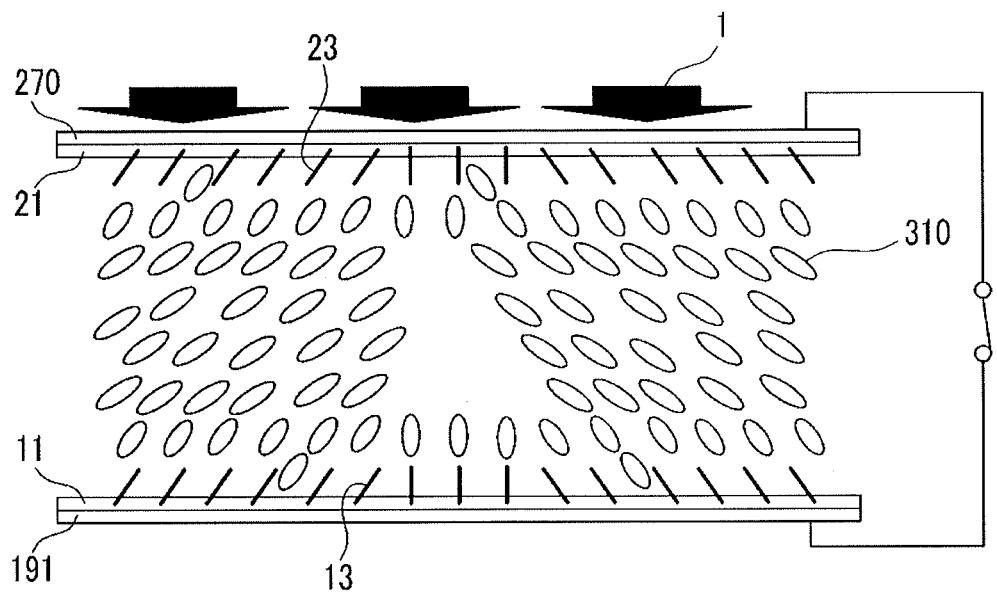
FIGS. 10 and 11 illustrate schematic diagrams illustrating a method for forming a pretilt of a liquid crystal by an alignment aid agent according to an exemplary embodiment.
Figure 11:
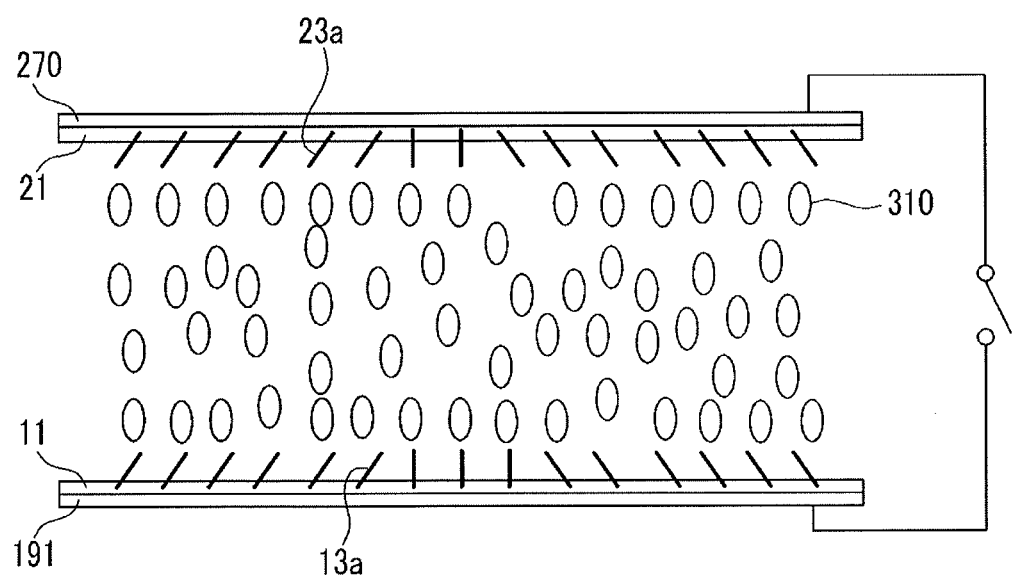

FIGS. 10 and 11 illustrate schematic diagrams illustrating a method for forming the pretilt of the liquid crystal by the alignment aid agent according to an exemplary embodiment.

Hereinafter, a method for manufacturing the liquid crystal display according to an exemplary embodiment will be described.

First, the lower display panel 100 and the upper display panel 200 may each be manufactured.

The lower display panel 100 may be manufactured by the following method.

A plurality of thin films may be laminated and patterned on the first substrate 110 to sequentially form the gate lines 121 including the gate electrodes 124a and 124b, the gate insulating layer 140, the semiconductor layers 154a and 154b, the data lines 171a and 171b including the source electrodes 173a and 173b, the drain electrodes 175a and 175b, and the lower passivation layer 180p.

Subsequently, the color filter 230 may be formed on the lower passivation layer 180p, and the light blocking member 220 for blocking light leakage may be formed on the color filter 230. The upper passivation layer 180q may be formed on the light blocking member 220 and the color filter 230.

Conductive layers such as ITO or IZO may be laminated on the upper passivation layer 180q and patterned to, as illustrated in FIGS. 8 and 9, form the pixel electrode 191 having a vertical stem portion 192, a horizontal stem portion 193, and the plurality of fine branch portions 194a, 194b, 194c, and 194d extending therefrom.

The column spacer 363 may be formed on the upper passivation layer 180q or the pixel electrode 191.

Subsequently, the alignment layer 11 formed of the lower layer including the organic material and the upper layer including the inorganic material may be applied on the pixel electrode 191. Herein, the forming of the alignment layer 11 may include adding the inorganic material of a monomolecule to a solution including the organic material of a polymer to form an organic and inorganic mixture material. For example, the organic and inorganic mixture material may be formed by adding the inorganic material of the monomolecule including at least one of a compound represented by the following Chemical Formula 5 and a compound represented by the following Chemical Formula 6 having a content of 2 wt % to 4 wt % to a polyimide solution.

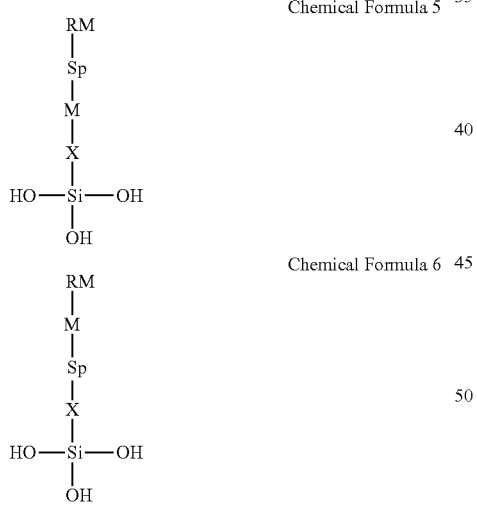

Chemical Formula 5

Chemical Formula 6

Herein, in Chemical Formula 5 and Chemical Formula 6, RM is

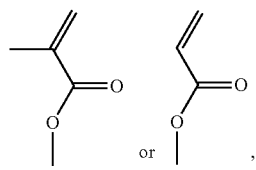

Sp is a carbon chain structure represented by —(CH$_2$)$_n$—, in which n is 2 to 10, M is any one of benzene, cyclohexane,

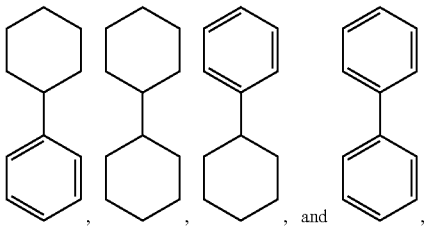

and X is

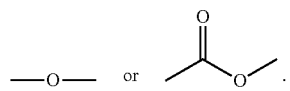

Thereafter, the organic and inorganic mixture material may be applied on the pixel electrode 191, and the applied organic and inorganic mixture material may be heat-treated. In this case, the organic and inorganic mixture material may be divided into layers to form the upper layer and the lower layer.

It may be preferable that the lower alignment layer 11 be formed to cover the column spacer 363 in a uniform thickness.

The upper display panel 200 may be manufactured by the following method.

The common electrode 270 may be formed on the substrate 210. Subsequently, the alignment layer 21 formed of the lower layer including the organic material and the upper layer including the inorganic material may be applied on the common electrode 270. The upper alignment layer 21 included in the upper display panel 200 may be formed by the same method as the aforementioned lower alignment layer 11.

The lower display panel 100 and the upper display panel 200 manufactured by the aforementioned method may be assembled, and the liquid crystal molecules 310 may be injected therebetween to form the liquid crystal layer 3. However, the liquid crystal layer 3 may be formed by a manner for dripping the liquid crystal molecules 310 on the lower display panel 100 or the upper display panel 200.

Referring to FIG. 10, a voltage may be applied to the pixel electrode 191 and the common electrode 270. Reactive mesogens 13 and 23 included in the alignment layers 11 and 21 may extend from insides of the alignment layers 11 and 21 and have a pretilt by applying the voltage.

As described above, light 1 may irradiate in a state where the voltage is applied between the pixel electrode 191 and the common electrode 270. As the light 1, light having a wavelength at which the reactive mesogens 13 and 23 are polymerized may be used. Ultraviolet light or the like may be used.

Referring to FIG. 11, the alignment polymers 13a and 23a may be formed by polymerizing the reactive mesogens 13 and 23 included in the alignment layers 11 and 21 after irradiation of the light. The alignment polymers 13a and 23a may be arranged according to alignment of the liquid crystal, and after the applied voltage is removed, arrangement may be maintained to control the pretilt of the liquid crystal 310.

Figure 12:
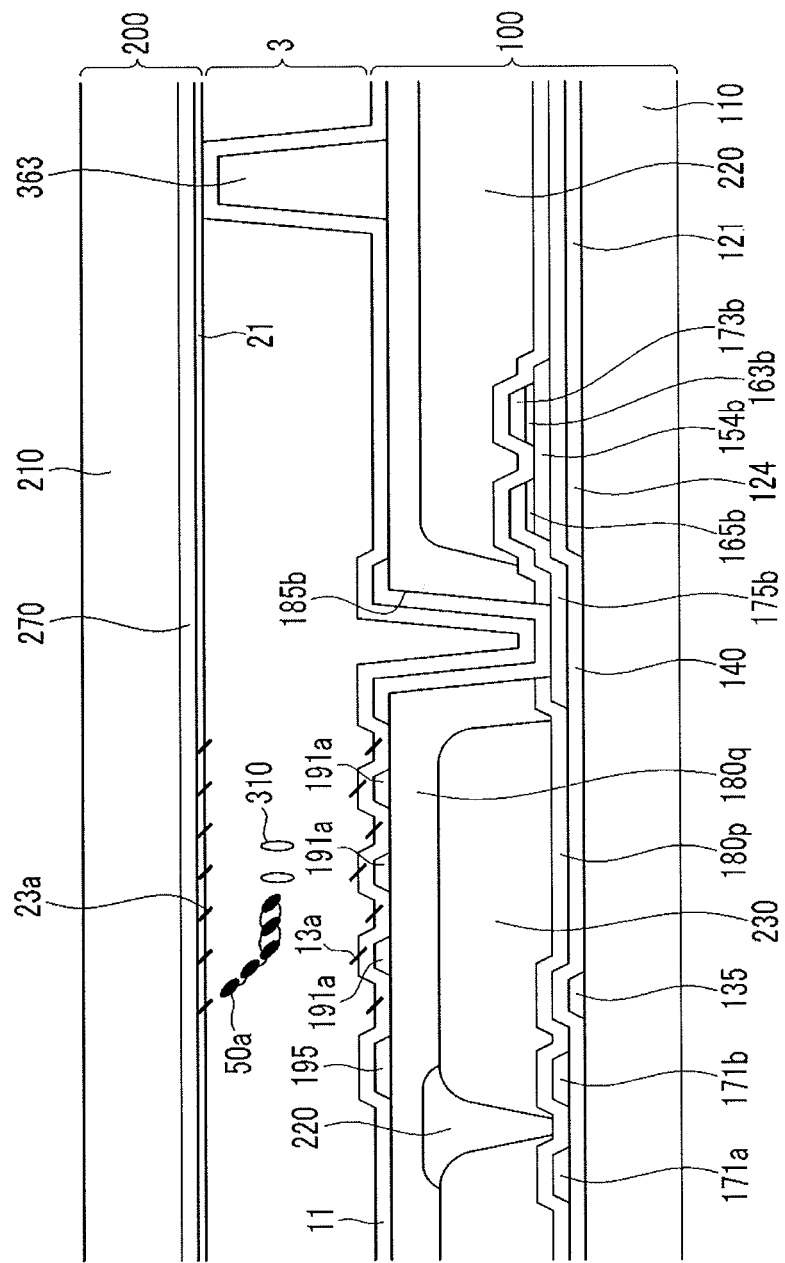
FIG. 12 illustrates a top plan view illustrating the liquid crystal display according to an exemplary embodiment.
Figure 13:
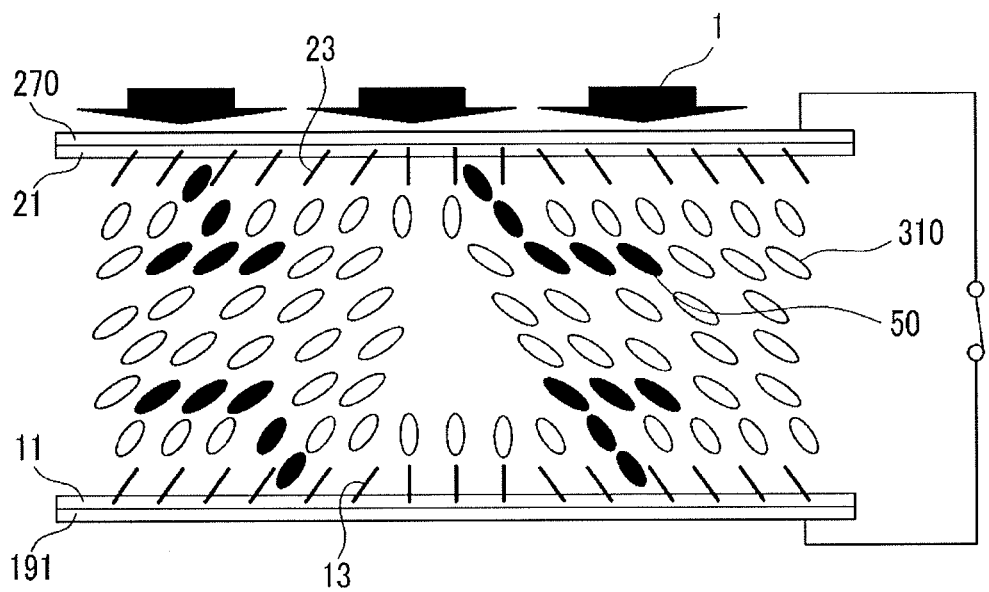
FIGS. 13 and 14 illustrate schematic diagrams illustrating a method for forming the pretilt of the liquid crystal by the alignment aid agent according to the exemplary embodiment of FIG. 12.
Figure 14:
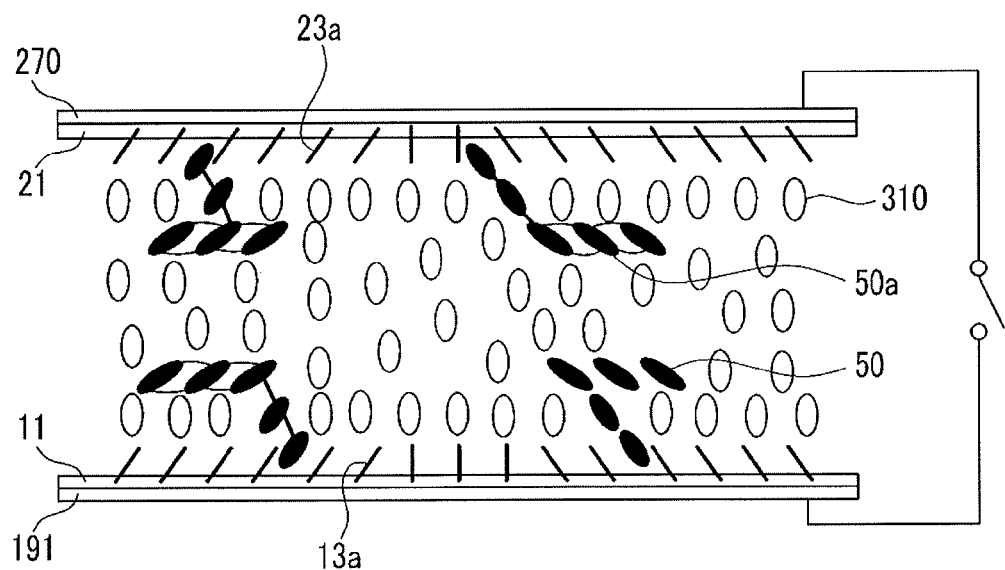

FIG. 12 illustrates a top plan view illustrating the liquid crystal display according to an exemplary embodiment. FIGS. 13 and 14 illustrate schematic diagrams illustrating the method for forming the pretilt of the liquid crystal by the alignment aid agent according to the exemplary embodiment of FIG. 12.

The exemplary embodiment described in FIG. 12 may include components substantially the same as those of the exemplary embodiments described in FIGS. 1 to 4. However, hereinafter, a different elements will be described.

In the exemplary embodiment of FIG. 12, an alignment polymer 50a may further be included in the liquid crystal layer 3. The alignment polymer 50a may be formed by irradiating the light on the reactive mesogen.

Next, referring to FIG. 13, the voltage may be applied to the pixel electrode 191 and the common electrode 270. The reactive mesogens 13 and 23 included in the alignment layers 11 and 21 may extend from the insides of the alignment layers 11 and 21 and have a pretilt, and a reactive mesogen 50 included in the liquid crystal layer may be inclined together with the liquid crystal 310 in a direction that may be parallel to the length direction of the fine branches 194a-194d of the pixel electrode 191 when the voltage is applied.

As described above, the light 1 may irradiate in a state where the voltage is applied between the pixel electrode 191 and the common electrode 270. As the light 1, light having a wavelength at which the reactive mesogens 13, 23, and 50 are polymerized may be used. Ultraviolet light or the like may be used.

Referring to FIG. 13, the alignment polymers 13a and 23a may be formed by polymerizing the reactive mesogens 13 and 23 included in the alignment layers 11 and 21 after irradiation of the light. The reactive mesogens 50 collected at adjacent positions may be photo-polymerized to form an alignment polymer 50a. The alignment polymers 13a, 23a, and 50a may be arranged according to alignment of the liquid crystal, and after the applied voltage is removed, arrangement may be maintained to control the pretilt of the liquid crystal molecules 310.

By way of summation and review, an alignment layer may be formed of an organic material, an inorganic material, or a combination thereof. An inorganic alignment layer formed of the inorganic material may exhibit poor coating quality in a step portion of a column spacer, and thus compression and restoration characteristics of the column spacer may deteriorate.

In contrast, embodiments herein may provide a liquid crystal display including a novel alignment layer having improved coating quality, and a method for manufacturing the same. According to exemplary embodiments, it may be possible to cover a column spacer with an organic material having good coating quality in a uniform thickness by forming organic and inorganic alignment layers that are separated into upper and lower layers. Accordingly, compression and restoration characteristics of the column spacer may be improved, and thus it may be possible to prevent the liquid crystal from not being filled and having voids.

| <Description of symbols> | | | |
|---|---|---|---|
| 3 | Liquid crystal layer | 13, 23, 50 | Reactive mesogen |
| 13a, 23a, 50a | Alignment polymer | 100 | Lower display panel |
| 200 | Upper display panel | 180p | Lower passivation layer |
| 180q | Upper passivation layer | 230 | Color filter |
| 270 | Common electrode | 310 | Liquid crystal molecule |
| 363 | Column spacer | 220 | Light blocking member |

Example embodiments have been disclosed herein, and although specific terms may be employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A liquid crystal display comprising:
   a first substrate;
   a second substrate facing the first substrate;
   a field generating electrode on at least one of the first substrate and the second substrate;
   an alignment layer on the field generating electrode; and
   a liquid crystal layer between the first substrate and the second substrate,
   wherein the alignment layer includes:
   a lower layer including an organic material and on the field generating electrode,
   an upper layer on the lower layer and including a polysiloxane-containing material, the upper layer including a plurality of island shape portions on the lower layer.

2. The liquid crystal display as claimed in claim 1, wherein:
   the upper layer and the lower layer are layer-separated.

3. The liquid crystal display as claimed in claim 1, wherein:
   the lower layer is in contact with the field generating electrode.

4. The liquid crystal display as claimed in claim 1, wherein:
   each of the island shape portions includes a main chain and a side chain connected to the main chain,
   the main chain includes polysiloxane, and
   the side chain includes a photo-reactive group.

5. The liquid crystal display as claimed in claim 4, wherein:
   the side chain of each of island shape portions includes at least one of a compound represented by the following Chemical Formula 1 and a compound represented by the following Chemical Formula 2:

Chemical Formula 1

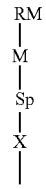

Chemical Formula 2 wherein in Chemical Formula 1 and Chemical Formula 2 RM is

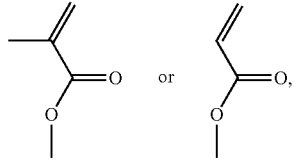 or 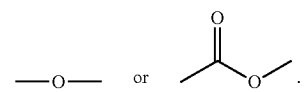

Sp is a carbon chain structure represented by —$(CH_2)_n$—, in which n is 2 to 10, M is any one of benzene, cyclohexane,

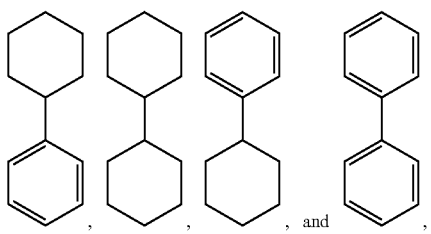

and X is

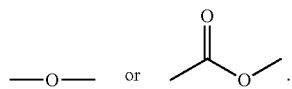

6. The liquid crystal display as claimed in claim 5, wherein:
   the lower layer includes the main chain and the side chain connected to the main chain, the main chain includes polyimide, and the side chain includes a vertical alignment group.

7. The liquid crystal display as claimed in claim 6, wherein:
   the side chain of the lower layer includes at least one of a compound represented by the following Chemical Formula 3 and a compound represented by the following Chemical Formula 4:

Chemical Formula 3

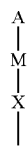

Chemical Formula 4

wherein in Chemical Formula 3 and Chemical Formula 4, A is an alkyl group having 3 to 30 carbon atoms, M is any one of benzene, cyclohexane,

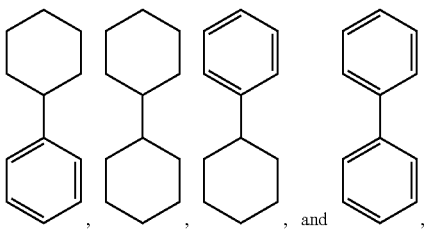

and X is

—O— or 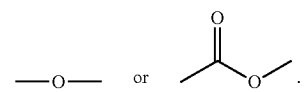

8. The liquid crystal display as claimed in claim 7, further comprising:
   a column spacer between the first substrate and the second substrate,
   wherein the alignment layer covers the column spacer in a uniform thickness.

9. The liquid crystal display as claimed in claim 8, wherein:
   the alignment layer includes a portion disposed between the column spacer and any one of the first substrate and the second substrate.

10. The liquid crystal display as claimed in claim 1, wherein:
    the liquid crystal layer includes a liquid crystal material and an alignment polymer.

11. A method for manufacturing a liquid crystal display, comprising:
    forming a field generating electrode on at least one of a first substrate and a second substrate facing the first substrate;
    forming an alignment layer on the field generating electrode;
    forming a liquid crystal layer between the first substrate and the second substrate; and
    irradiating light on the alignment layer,
    wherein the alignment layer includes a lower layer including an organic material and an upper layer on the lower layer and including a polysiloxane-containing material, the upper layer being formed of a plurality of island shape portions on the lower layer.

12. The method for manufacturing a liquid crystal display as claimed in claim 11, wherein:
    the forming of the alignment layer includes:
    adding an inorganic material of a monomolecule to a solution including the organic material of a polymer to form an organic and inorganic mixture material,
    applying the organic and inorganic mixture material on the field generating electrode,
    heat-treating the organic and inorganic mixture material, and
    layer-separating the organic material and the inorganic material to form the upper layer and the lower layer.

13. The method for manufacturing a liquid crystal display as claimed in claim 12, wherein:
    the lower layer is in contact with the field generating electrode.

14. The method for manufacturing a liquid crystal display as claimed in claim 13, wherein:

the inorganic material of the monomolecule includes siloxane and a photo-reactive group.

15. The method for manufacturing a liquid crystal display as claimed in claim 14, wherein:
the inorganic material of the monomolecule includes at least one of a compound represented by the following Chemical Formula 5 and a compound represented by the following Chemical Formula 6:

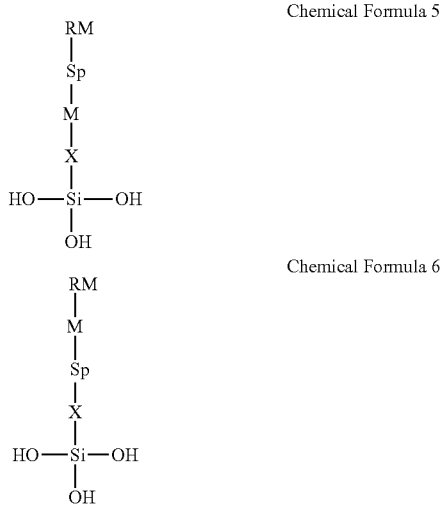

Chemical Formula 5

Chemical Formula 6 wherein in Chemical Formula 5 and Chemical Formula 6, RM is

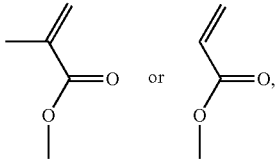

Sp is a carbon chain structure represented by $-(CH_2)_n-$, in which n is 2 to 10, M is any one of benzene, cyclohexane,

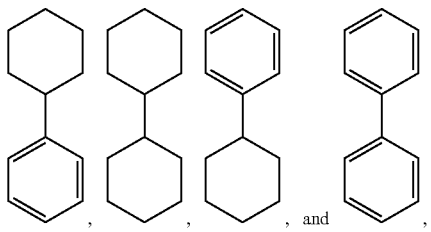

and X is

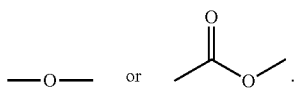

16. The method for manufacturing a liquid crystal display as claimed in claim 15, wherein:
the organic material of the polymer includes polyimide to which a vertical alignment group is connected as a side chain.

17. The method for manufacturing a liquid crystal display as claimed in claim 16, wherein:
the vertical alignment group includes at least one of a compound represented by the following Chemical Formula 3 and a compound represented by the following Chemical Formula 4:

Chemical Formula 3

Chemical Formula 4

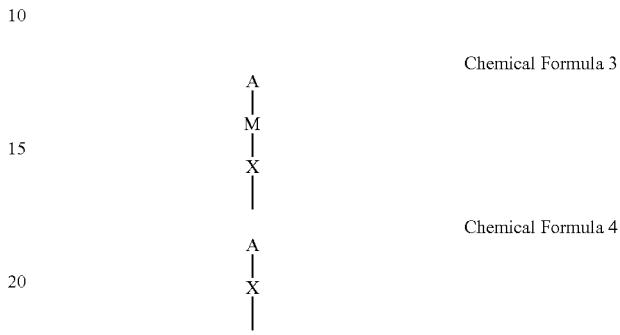

wherein in Chemical Formula 3 and Chemical Formula 4, A is an alkyl group having 3 to 30 carbon atoms, M is any one of benzene, cyclohexane,

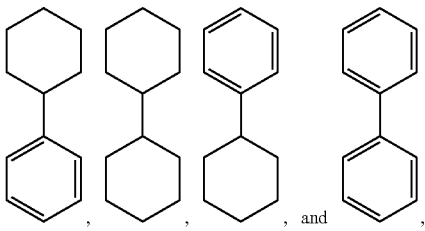

and X is

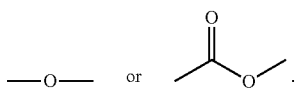

18. The method for manufacturing a liquid crystal display as claimed in claim 17, further comprising:
applying an electric field to the liquid crystal layer before irradiating the light on the alignment layer.

19. The method for manufacturing a liquid crystal display as claimed in claim 11, further comprising:
forming a column spacer on the first substrate or the second substrate before the forming of the alignment layer,
wherein the alignment layer covers the column spacer in a uniform thickness.

20. The method for manufacturing a liquid crystal display as claimed in claim 19, wherein:
the forming of the liquid crystal layer includes:
injecting a liquid crystal material and an alignment aid agent between the first substrate and the second substrate, and
irradiating light on the liquid crystal layer to form an alignment polymer.

* * * * *